United States Patent
Toombs et al.

(10) Patent No.: US 12,534,695 B2
(45) Date of Patent: Jan. 27, 2026

(54) PRODUCING BEER USING A WORT CONCENTRATE

(71) Applicants: Peter Toombs, Charlottetown (CA); Brian Watson, Hamilton (NZ)

(72) Inventors: Peter Toombs, Charlottetown (CA); Brian Watson, Hamilton (NZ)

( * ) Notice: Subject to any disclaimer, the term of this patent is extended or adjusted under 35 U.S.C. 154(b) by 735 days.

(21) Appl. No.: 17/682,797

(22) Filed: Feb. 28, 2022

(65) Prior Publication Data

US 2022/0186161 A1 Jun. 16, 2022

Related U.S. Application Data

(63) Continuation-in-part of application No. 15/956,415, filed on Apr. 18, 2018, now abandoned, and a
(Continued)

(30) Foreign Application Priority Data

Sep. 1, 2015 (NZ) ........................................ 711711

(51) Int. Cl.
  *C12C 7/28* (2006.01)
  *C12C 11/00* (2006.01)
  (Continued)

(52) U.S. Cl.
  CPC .............. *C12C 7/28* (2013.01); *C12C 11/006* (2013.01); *C12C 11/11* (2013.01); *C12C 13/10* (2013.01); *C12C 2200/35* (2013.01)

(58) Field of Classification Search
  CPC ......... C12C 7/28; C12C 7/282; C12C 11/006; C12C 11/11; C12C 13/10
  See application file for complete search history.

(56) References Cited

U.S. PATENT DOCUMENTS

| 3,384,553 A | 5/1968 | Caslavsky |
| 3,814,003 A | 6/1974 | Vacano |

(Continued)

FOREIGN PATENT DOCUMENTS

| CA | 931 090 | 7/1973 |
| DE | 102006009612 A1 | 9/2007 |

(Continued)

OTHER PUBLICATIONS

Ault, R. G., "Spoilage Bacteria in Brewing", Mitchells and Butlers, Ltd., Cape Hill Brewery, Birmingham, pp. 376-391.
(Continued)

*Primary Examiner* — John J Norton
(74) *Attorney, Agent, or Firm* — Greer, Burns & Crain, Ltd

(57) ABSTRACT

Production of beer using a wort concentrate is described. In an embodiment, a system includes at least one fermentation tank comprising temperature control means. At least one processor configured to execute computer-readable instructions stored on at least one computer-readable storage media to perform a method of producing beer, including forming a mixture of a wort concentrate including hops and having a specific gravity of at least 1.085 kg/m3, with water and yeast in the fermentation tank, wherein forming the mixture comprises pumping the wort concentrate into the fermentation tank. The mixture is fermented and fermentation conditions monitored. On determining that predetermined fermentation conditions have been met, the fermented mixture is cooled to a temperature between zero and four degrees Celsius through controlling the temperature control means. The fermented mixture is carbonated, following addition of yeast finings, such that beer is produced.

5 Claims, 10 Drawing Sheets

Related U.S. Application Data continuation-in-part of application No. 15/755,978, filed as application No. PCT/IB2016/055183 on Aug. 31, 2016, now Pat. No. 11,326,135, said application No. 15/956,415 is a continuation of application No. 13/430,797, filed on Mar. 27, 2012, now abandoned.

(60) Provisional application No. 61/470,814, filed on Apr. 1, 2011.

(51) Int. Cl.
*C12C 11/11* (2019.01)
*C12C 13/10* (2006.01)

(56) References Cited

U.S. PATENT DOCUMENTS

| | | |
|---|---|---|
| 3,959,120 A | 5/1976 | Pollock |
| 4,140,799 A | 2/1979 | Nagodawithana |
| 4,496,605 A | 1/1985 | Targan |
| 4,653,388 A | 3/1987 | Wilkinson |
| 4,773,315 A | 9/1988 | Enenkel |
| 4,856,421 A | 8/1989 | Whitford |
| 5,573,142 A | 11/1996 | MJorellato |
| 5,865,093 A | 2/1999 | Wasmuht |
| 6,032,571 A | 3/2000 | Brous |
| 6,631,732 B1 | 10/2003 | Koster |
| 7,214,402 B2 | 5/2007 | Burdick |
| 7,963,213 B1 | 6/2011 | Murdock |
| 9,228,163 B1 | 1/2016 | Mitchell |
| 2005/0003041 A1 | 1/2005 | Kamil |
| 2005/0214408 A1 | 9/2005 | Pilkington et al. |
| 2007/0056994 A1 | 3/2007 | Woodnorth |
| 2007/0148741 A1 | 6/2007 | Festersen et al. |
| 2010/0129490 A1 | 5/2010 | Williams |
| 2010/0192490 A1 | 8/2010 | Chang |
| 2010/0310715 A1 | 12/2010 | Kosar et al. |
| 2011/0117239 A1 | 5/2011 | Griese |
| 2012/0040025 A9 | 2/2012 | Currie et al. |
| 2012/0237654 A1 | 9/2012 | Roth |
| 2015/0000532 A1 | 1/2015 | Mitchell et al. |
| 2015/0105738 A1 | 4/2015 | Mehta |
| 2018/0237731 A1* | 8/2018 | Toombs ............... C12C 11/006 |
| 2020/0385656 A1* | 12/2020 | Grone ................... C12C 11/006 |
| 2021/0301231 A1* | 9/2021 | Singh ..................... C12C 3/085 |

FOREIGN PATENT DOCUMENTS

| | | |
|---|---|---|
| GB | 2123850 A | 2/1984 |
| GB | 2146705 A | 4/1985 |
| WO | 2012131475 A1 | 10/2012 |

OTHER PUBLICATIONS

Stewart G. G. et al., "One Hundred Years of Yeast Research and Development in the Brewing Industry", J. Inst. Brew., November-December, May 20, 1986, pp. 537-558, vol. 92, pp. 537-558.

Gjertsen P., "Carboydrate Composition of Wort and Beer", J. Inst. Brew, Feb. 24, 1953, pp. 296-306.

Adams, M.R. et al., "Effect of the ethanol content of beer on the heat resistance of a spoilage Lactobacillus", J. of Applied Bacteriology, 1989, pp. 491-495, vol. 66.

Briggs et al., "Malting and Brewing Science", Chapman and Hall, 1981, 2nd addition, pp. 714-715, vol. 11.

Briggs et al., "Malting and Brewing", Chapman and Hall, 1981, 2nd edition, part 1, pp. 264-265, 280-281, 328.

International Search Report, Mail Date: Jul. 5, 2012, Application No. PCT/IB2012/000624, Filed Date: Mar. 28, 2012, 6 pages.

International Search Report for International Patent Application No. PCT/IB2016/055183 dated Jan. 13, 2017.

Written Opinion for International Patent Application No. PCT/IB2016/055183 dated Jan. 13, 2017.

* cited by examiner

PRODUCING BEER USING A WORT CONCENTRATE

CROSS REFERENCE TO RELATED APPLICATIONS

This application is a continuation-in-part of U.S. patent application Ser. No. 15/956,415 filed Apr. 18, 2018 which is a continuation of U.S. patent application Ser. No. 13/430,797 filed Mar. 27, 2012 which claims the benefit of priority to U.S. provisional patent application 61/470,814 filed Apr. 1, 2011, and this application is a continuation-in-part of U.S. patent application Ser. No. 15/755,978 filed Feb. 27, 2018 which is a 371 application of PCT/IB2016/055183 filed Aug. 31, 2016 and claiming the benefit of priority to New Zealand patent application 711711 filed Sep. 1, 2015, the entire disclosures of all applications are herein incorporated by reference.

TECHNICAL FIELD

Various embodiments relate generally to beer production and restaurant services, pubs, retail stores, and more particularly, to a method of producing wort concentrate, which is subsequently directed to individual commercial establishments where beer is crafted, produced, and sold to consumers.

BACKGROUND

Beer production is an age-old art; one that is often individualized for particular regions, tastes, styles, and the like. "Micro-brews" and uniquely crafted beers allow for more positive variations, as opposed to major beer manufacturers, in beer quality for a consumer.

Generally, beer production of beer starts by producing "sweet wort." The sweet wort is formed by the addition of water to malted and unmalted crushed grain such as, but not limited to, barley to form a slurry or mash in a mash tun. Through the action of naturally occurring enzymes this mash is then converted into the sweet wort. Subsequently, the liquid in the sweet wort is drained from the mash tun and directed to a brew kettle where hops are added. The hopped liquid is then boiled in the brew kettle to produce a "hopped wort." The final step in the brewing process involves the addition of yeast to cause fermentation to occur in a fermentation vessel, which in turn results in the production of alcohol.

Restaurants generally provide customers with beer by purchasing beer produced at a brewery, which is then shipped to a restaurant for sale, or, in a few instances, by producing the beer on-site at the restaurant. Restaurants that produce the beer on-site are typically referred to as "brew-pubs." The vast majority of beer is brewed by the major breweries and then transported to various restaurants and served either in individual containers (bottles or cans) or out of kegs.

Some restaurants have made the large capital expenditures necessary to brew beer from start to finish on-site; however, the actual number of such restaurants is low because of the associated financial investment and liability in purchasing, operating, and maintaining a quality beer production facility in a restaurant. In addition, such restaurants may find this expansion difficult to achieve for several reasons, not the least of them being because of the cost involved in building new brewing facilities and/or the lack of skilled brew masters to oversee the brewing process in the individual restaurants. Consequently, often times a successful restaurant offering on-site brewing as well as other restaurant services is unable to expand beyond a single restaurant because of the capital cost involved with establishing another on-site brewery and/or the lack of a brew master to oversee the brewing operation.

Aspects of the technology of the present disclosure are directed to overcoming one or more of the problems discussed above. It is an object of the present invention to address one or more of the foregoing problems or at least to provide the public with a useful choice.

Further aspects and advantages of the present disclosure will become apparent from the ensuing description which is given by way of example only.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments describe techniques for producing beer using a wort concentrate. In various embodiments, a wort concentrate having a specific gravity of at least about 1.085 kg/m3 is produced and packaged predetermined amounts while at a temperature of about fifty-eight degrees Celsius or greater. In various embodiments, acid and sulphur can be added to the wort concentrate to produce a sulfur concentration of 10 ppm or more and a pH below about 3.0. Packages can then be shipped or otherwise transported or stored. In various embodiments, the wort concentrate is mixed with predetermined amounts of filtered water, an acid neutralizing solution, and yeast, and fermented for a predetermined time period. Various embodiments can further include cooling the fermented mixture to about zero degrees Celsius and storing the fermented mixture. In some embodiments, yeast finings are introduced and the fermented mixture is filtered and carbonated such that beer is produced.

According to one aspect of the present technology there is provided a system including: at least one fermentation tank, comprising temperature control means; at least one processor configured to execute computer-readable instructions stored on at least one computer-readable storage media to perform a method of producing beer, including the steps of: forming a mixture of a wort concentrate including hops and having a specific gravity of at least 1.085 kg/m3, with water and yeast in the fermentation tank, wherein forming the mixture comprises pumping the wort concentrate into the fermentation tank; fermenting the mixture; monitoring fermentation conditions, and on determining with at least one processor that predetermined fermentation conditions have been met, cooling the fermented mixture to a temperature between zero and four degrees Celsius through controlling the temperature control means; and carbonating the fermented mixture, following addition of yeast finings, such that beer is produced.

According to one aspect of the present technology there is provided a method for producing beer including: forming a mixture of a wort concentrate including hops and having a specific gravity of at least 1.085 kg/m3, with water and yeast in a fermentation tank; fermenting the mixture; monitoring fermentation conditions, and on determining with at least one processor that predetermined fermentation conditions have been met, cooling the fermented mixture to between zero and about four degrees Celsius; adding yeast finings; and carbonating the fermented mixture such that beer is produced.

According to one aspect of the present disclosure there is provided an additive dispensing device. The dispensing device may include a vessel body including a chamber, the chamber having a closed end and an open end. The dispensing device may include a pressure release means between the chamber and atmosphere. The dispensing device may include a controllable valve positioned between the closed end and the open end, configured to selectively open and close a flow path between the closed end and the open end.

According to one aspect of the present disclosure there is provided a brewing system. The brewing system may include a fermentation vessel. The brewing system may include an additive dispensing device. The dispensing device may include a vessel body including a chamber, the chamber having a closed end and an open end, wherein the open end opens into the fermentation vessel. The dispensing device may include a pressure release means between the chamber and atmosphere. The dispensing device may include a controllable valve positioned between the closed end and the open end, configured to selectively open and close a flow path between the chamber and the fermentation vessel.

According to one aspect of the present disclosure there is provided a method of dispensing additives into a fermentation vessel of a brewing system, the brewing system including an additive dispensing device including a vessel body including a chamber, the chamber having a closed end and an open end, wherein the open end opens into the fermentation vessel, a pressure release means between the chamber and atmosphere, and a controllable valve positioned between the closed end and the open end, configured to selectively open and close a flow path between the chamber and the fermentation vessel. The method may include receiving confirmation of fermentation within the fermentation vessel being completed. The method may include receiving input indicating additives are to be dispensed into the fermentation vessel. The method may include receiving confirmation of additives being placed in chamber. The method may include controlling the controllable valve to open a flow path between the chamber and the fermentation vessel.

According to one aspect of the present disclosure there is provided a method of dispensing additives into a fermentation vessel of a brewing system, the brewing system including an additive dispensing device including a vessel body including a chamber, the chamber having a closed end and an open end, wherein the open end opens into the fermentation vessel, a pressure release means between the chamber and atmosphere, and a controllable valve positioned between the closed end and the open end, configured to selectively open and close a flow path between the chamber and the fermentation vessel. The method may include monitoring at least one condition associated with fermentation of a beverage in the fermentation vessel. The method may include determining that additives are to be dispensed into the fermentation vessel based on the at least one condition. The method may include controlling the controllable valve to open a flow path between the chamber and the fermentation vessel.

Reference will herein be made to the fermented beverage produced by the brewing system being beer. However, it should be appreciated that this is not intended to be limiting, and that in exemplary embodiments other fermented beverages may be produced—for example cider.

It is envisaged that the present disclosure may have particular application to the dispensing of additives into a pressurised fermentation vessel. During fermentation of beer, carbon dioxide ($CO_2$) development of the beverage in the fermentation vessel builds pressure within the vessel. While exact levels may vary depending on the beverage being fermented, this pressure may be in the order of 1 to 2 bar.

Maintenance of pressure levels may be desirable in order to avoid compromising fermentation, or subsequent carbonation of the beverage. Further, it may be useful to reduce exposure to environmental conditions outside the fermentation vessel in the interests of maintaining stability of the beverage and sanitation of the vessel.

However, certain additives should ideally be introduced to the beverage at this stage in order to achieve desired flavours. The additive dispensing device of the present disclosure enables the introduction of additives with minimal exposure to atmospheric pressure and associated environmental effects. It should be appreciated that while it is envisaged that the present disclosure has particular application to fermentation vessels in which primary and/or secondary fermentation occurs, the additive dispensing device may be used in other pressurised vessels of a brewing system in which pressure is maintained above atmosphere and it is desirable to introduce additives.

It should be appreciated that the additives dispensed into the fermentation vessel using the additive dispensing device may be any known in the art, such as hops, finings, backsweeteners, fruit pulp, fruit peel, or spices.

It is envisaged that the present disclosure may have particular application to the addition of solid particulate matter—for example dry hops. Dry hopping refers to the introduction of hops to the beverage after cooling of the wort—i.e. during or after fermentation. This is a relatively recent development in brewing. The addition of hops after the boiling means that they do not impart bitterness, but provide hop flavour, and more importantly, hop aroma. Care must be taken to remove these hops after a certain timeframe so as not to impart harsh astringent characters into the beer.

It is envisaged that the rapid in-flow of pressurised gas from the fermentation vessel due to the pressure differential may assist in breaking up the particulate matter which has potentially settled (whether in the chamber or during storage), and thereby increase distribution and/or exposure of the additive—in the case of dry hopping for extraction of oils from the hops.

Dry hopping regimes vary from brewery to brewery. In an exemplary embodiment dry hopping may be scheduled by an operator once the fermentation specific gravity reaches the terminal gravity—measured, for example, using a hydrometer. Using the device of the present disclosure, at this stage the hops are added by opening the flow path. As the valve opens, the $CO_2$ rushes into the chamber and breaks up the hops, allowing them to drop into the liquid.

The action of dropping the hops into the warm (for example approximately 20 degrees) carbonated liquids may create carbonation sites which cause the product to foam. In some configurations, if no allowance is made for the internal pressure of the vessel, then product may eject from the port with great force. The beer may then be left in contact with the hops for a period of 24-48 hours, and then cooled to 2 degrees Celsius for maturation.

However, it should be appreciated that description of the use of solid particulate matter with the additive dispensing device is not intended to be limiting. For example, in an exemplary embodiment the additive dispensing device may be used to dispense finings into the fermentation tank, which are typically liquid in form. Finings can be used to form a precipitate with organic compounds such as proteins, tannins, yeast cells to encourage settling of this precipitate in the bottom of the vessel which then can be removed. In some circumstances the desired effect may be achieved standing the beverage over an extended period to allow settling to occur. However this may not be suitable in all cases, whether considering the shelf-life of the beverage or the commercial implications of increasing production times and maintaining an extended inventory.

It is envisaged that the rapid in-flow of pressurised gas from the fermentation vessel due to the pressure differential may assist spraying the finings into the vessel, thereby increasing distribution and therefore likely efficacy of the finings. In an exemplary embodiment the contents of the fermentation vessel may be agitated on adding of the finings (for example a stream of $CO_2$ from a source of pressurised $CO_2$) —whether manually or as an automated response to activation of the additive dispensing device. However, it is anticipated that such agitation may be unnecessary due to the distribution of the finings as it bursts from the device.

In an exemplary embodiment, in use the additive dispensing device may be oriented such that the open end faces downwardly. It is envisaged that this may assist in gravitational feeding of the additives from the chamber into the fermentation vessel. The additive dispensing device may also be secured substantially toward the top of the fermentation vessel above the liquid filling level.

In an exemplary embodiment, the additive dispensing device may include a releasable access into the chamber, for the introduction of the additive(s) into the chamber. For example, the vessel body may include a removable cap at the closed end. The cap may be releasably secured to the vessel body using any suitable means known in the art—for example, complementary helical threads on the cap and the body, push lock, or a hinged configuration with a clip.

A purpose of the pressure release means is to release pressure from the chamber after opening of the controllable valve and therefore pressurisation by the fermentation vessel. In doing so, it is envisaged that the chamber may be equalised with atmosphere, and therefore prevent the operator being exposed to expulsion of pressurised fluid and/or additives through the releasable access the next time filling of the chamber with additives is required.

Further, the pressure release means releases pressure from the fermenter during the process of hop addition—i.e. while the chamber is fluidly connected to the vessel. This may assist in reducing the likelihood of significant foaming of the beer occurring and being ejected from the open port. It should be appreciated that a balance is to be struck between a sufficiently fast release of pressure from the chamber, but limiting the loss of desirable $CO_2$ pressure during dosing causing significant foaming of the beer.

While it should be appreciated that any suitable pressure release means known in the art may be used, it is envisaged that static means of releasing pressure may be preferable over valves having moving parts which introduce additional cost and a higher risk of failure.

In an exemplary embodiment, the pressure release means may be a pressure release aperture between the chamber and atmosphere. For example, the diameter of the pressure release aperture may be in the range of 1 to 5 mm. In an exemplary embodiment the diameter of the pressure release aperture may be substantially 2 mm. It is envisaged that this may provide a suitable rate of pressure release, while limiting the likelihood of fluid flow being diverted from expelling the additive from the chamber.

In an exemplary embodiment, an opening of the pressure release aperture into the chamber may be occluded from direct exposure to the open end of the chamber. In doing so, the likelihood of additive being expelled through the aperture may be reduced—particularly where the additive is liquid or a fine particulate in form.

For example, in an exemplary embodiment, the opening into the chamber may face away from the open end of the chamber. This may be achieved for example, using a conduit extending from the aperture into the chamber, and bending around such that its end (i.e. the opening) faces away from the open end. In another embodiment a cover may be provided over the opening, providing at least one lateral flow path to the aperture—for example, a bolt having a conduit through its shaft, and one or more lateral openings below the head of the bolt and intersecting the conduit through the shaft.

In an exemplary embodiment, the means for providing the opening of the pressure release aperture may be static. However, in an exemplary embodiment it is envisaged that the opening may be closed, or at least blocked to a greater extent, during the initial pressurisation of the chamber. For example, the exemplary conduit or bolt described above may be configured to be pushed towards the cap until closing of the valve. In an exemplary embodiment a biasing mechanism, such as a spring, may be provided to return the conduit or bolt once the valve is closed.

In an exemplary embodiment, the pressure release means may be provided by an allowance gap between components of the vessel body. For example, in exemplary embodiments in which the cap is threadably secured to the vessel body, the pressure release means may be an allowance gap between the threads between the cap and the vessel body.

It should be appreciated that the controllable valve may be any suitable device for controllably sealing the chamber from the fermentation vessel. Numerous valves and means for control are known in the art—however, there are certain arrangements which are envisaged as being particularly suited to the context of the present disclosure.

For example, it is envisaged that the control valve may be pneumatically controlled. Pneumatic controls provide for relatively high forces to be exerted, without requiring a high current draw which could have a number of implications for the complexity and cost of the system.

In an exemplary embodiment, the controllable valve may produce two adjacent apertures between the closed end and the open end when in an open state. It is envisaged that this may assist in directing the flow of pressurised fluid from the fermentation vessel through one aperture and up a side of the chamber, before blowing the additives through the other aperture.

For example, the controllable valve may be a butterfly valve. It is envisaged that the rotating action of the disk of the butterfly valve may produce a funnelling effect to encourage the flow of pressurised gas from the fermentation vessel up one side of the chamber as described above.

In an exemplary embodiment, activation of the controllable valve may be automated. For example, a controller of the brewing system may issue an alert to an operator that additives should be dispensed into the fermentation vessel based on current conditions (as described previously). The operator may add the additives to the chamber, and confirm to the controller that this action has been performed. The controller may then open the controllable valve at a suitable point in time, depending on the programming for that beverage.

However, it should be appreciated that this is not intended to be limiting, and in an exemplary embodiment the controllable valve may be manually activated.

In an exemplary embodiment, control means for operation of the controllable valve may be located remotely from the additive dispensing device. It is envisaged that this may encourage safe practices by reducing the likelihood of the valve being opened while the operator is within the vicinity of the additive dispensing device.

In an exemplary embodiment, the additive dispensing device may include a sensor for determining closure of the releasable access. The sensor may be a contact sensor, or a non-contact sensor (such as a reed switch or Hall-effect sensor). In such an embodiment, opening of the controllable valve may be disabled while the releasable access is open or unsecured.

In an exemplary embodiment, the additive dispensing device may include a pressure sensor for determining pressure within the chamber. An alert may be issued—for example at a control panel of the system, or using dedicated devices at the additive dispensing device—to alert an operator of high pressure levels before they open the chamber. This may also be used to detect blockage of the pressure release means in the event that pressure levels do not drop following closure of the valve.

In an exemplary embodiment the vessel body may be removable from the controllable valve, to assist in cleaning of the device.

In an exemplary embodiment the vessel body may include at least a portion made of a transparent material to enable visual inspection of the contents of the chamber. For example, the vessel body may be made of a transparent material, or the vessel body may include a transparent strip between its ends.

The above and other features will become apparent from the following description and the attached drawings.

BRIEF DESCRIPTION OF THE DRAWINGS

Further aspects of the present disclosure will become apparent from the following description which is given by way of example only and with reference to the accompanying drawings in which.

DETAILED DESCRIPTION

Overview

Various embodiments describe techniques for producing beer using a wort concentrate. In various embodiments, a wort concentrate having a specific gravity of at least about 1.085 kg/m3 is produced and packaged in predetermined amounts while at a temperature of about fifty-eight degrees Celsius or greater. In various embodiments, acid and sulphur can be added to the wort concentrate to produce a sulfur concentration of 10 ppm or more and a pH below about 3.0. Packages can then be shipped or otherwise transported or stored. In various embodiments, the wort concentrate is mixed with predetermined amounts of filtered water, an acid neutralizing solution, and yeast and fermented for a predetermined time period. Various embodiments can further include cooling the fermented mixture to about zero degrees Celsius and storing the fermented mixture. In some embodiments, yeast finings are introduced and the fermented mixture is filtered and carbonated such that beer is produced.

In the discussion that follows, a section entitled "Producing Wort Concentrate" describes various techniques for producing wort concentrate in accordance with one or more embodiments. Next, a section entitled "Packaging Wort Concentrate" describes various techniques for packaging wort concentrate in accordance with one or more embodiments. A section entitled "Producing Beer from Wort Concentrate" describes techniques for using packaged wort concentrate to produce beer for consumption. Finally, a section entitled "Example System" describes an example system that can be used to implement one or more embodiments.

Consider, now, an example process for producing wort concentrate in accordance with one or more embodiments.

Producing Wort Concentrate

Figure 1:
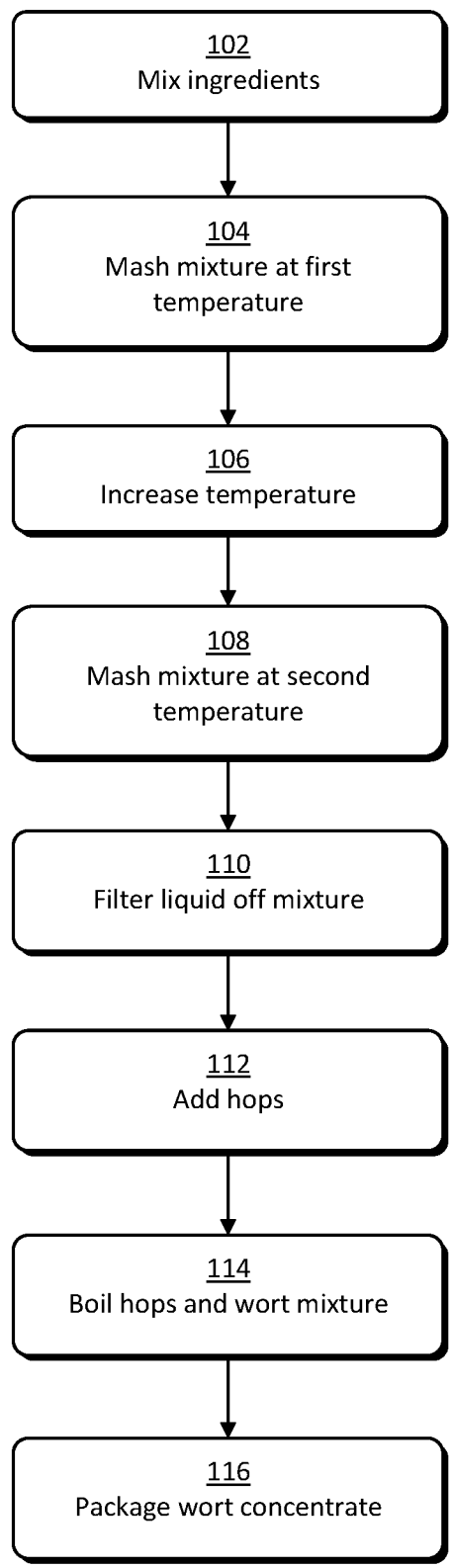
FIG. 1 is a block diagram of an example process for producing wort concentrate in accordance with one or more embodiments.

FIG. 1 is a block diagram of an example process 100 for producing wort concentrate in accordance with one or more embodiments.

Block 102 mixes ingredients. Ingredients can include malted grain and water. Malted grain can be, for example, barley, wheat, rice, or other grains. In some embodiments, the malted grain can be crushed or milled. Other ingredients can be added, depending on the particular embodiment. The ingredients can be mixed in a mash tun or other vessel.

Block 104 mashes the mixture of block 102 at a first temperature. This can be performed in any suitable way. In various embodiments, the first temperature is a temperature of approximately 65 degrees Celsius. Mashing enables the enzymes in the grain to convert starches (e.g., long chain carbohydrates) from the grain into fermentable sugars. This conversion process is sometimes called "saccharification." Fermentable sugars can include, for example, glucose, maltose, and malotriose. In various embodiments, the mixture is mashed for an amount of time between ten and thirty minutes. The particular time of mashing can vary depending on the particular embodiment.

Block 106 increases the temperature. This can be performed in any suitable way. For example, a brewer can increase the temperature manually or an automated system can be employed to increase the temperature to a temperature between 73 and 74 degrees Celsius. The particular increase in temperature can vary depending on the specific embodiment.

Next, block 108 mashes the mixture at the second temperature. This can be performed in any suitable way. For example, the mixture can be mashed for an amount of time between about thirty and about ninety minutes at a temperature between 73 and 74 degrees Celsius. This secondary mashing can produce fermentable sugars and/or non-fermentable sugars. Non-fermentable sugars, such as DP4 and DP3 for example, can contribute to the body and mouthfeel of the final beer product.

Block 110 filters liquid off the mixture. This can be performed in any suitable way. For example, the wort can be strained through the bottom of the mash tun in a process sometimes referred to as "lautering" and transferred into another vessel. Other methods of filtering the wort from the mash mixture can be used, depending on the particular embodiment.

Next, block 112 adds hops to the wort. This can be performed in any suitable way. For example, hops can be added, with or without other ingredients such as herbs or sugars, to the wort to add flavor, aroma, and bitterness.

Block 114 boils the hops and wort mixture. This can be performed in any suitable way. For example, the hops and wort mixture can be boiled in the brew kettle for a predetermined amount of time effective to convert hops from non-bitter compounds into bitter compounds. In various embodiments, the predetermined amount of time is between about 1 and about 3 hours. The particular amount of time can vary depending on the specific embodiment. In various embodiments, the hops and wort mixture is boiled effective to produce a wort concentrate having a specific gravity in a range from about 1.085 kg/m to about 1.095 kg/m3.

Finally, block 116 packages the wort concentrate. This can be performed in any suitable way, examples of which are provided above and below.

At least one result of process 100 is a wort concentration having a specific gravity in the range of about 1.085 kg/m to about 1.095 kg/m. By contrast, traditional wort concentrations have a specific gravity in the range of about 1.038 kg/m to about 1.060 kg/m. The increased specific gravity and concentration of the wort concentrate can be attributed at least in part to an increased boiling time over convention methods of wort production.

Having described an example method of producing a wort concentrate, consider now a description of techniques for packaging the wort concentrate.

Packaging Wort Concentrate

Figure 2:
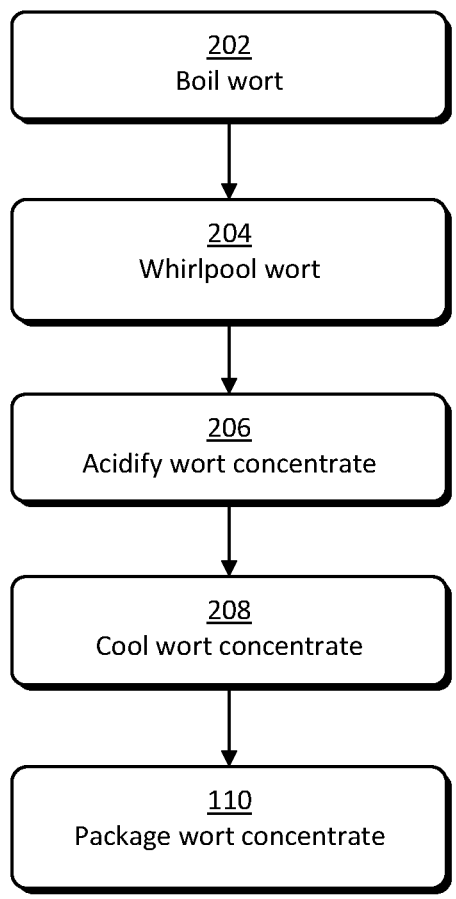
FIG. 2 depicts an example process for packaging wort concentrate in accordance with one or more embodiments.

FIG. 2 illustrates an example process 200 for packing wort concentrate in accordance with one or more embodiments. Process 200 can be employed, for example, by block 116 in FIG. 1.

Block 202 boils the wort. This can be performed in any suitable way. For example, wort can be boiled with hops, such as described above in reference to block 114.

Next, block 204 whirlpools the wort. This can be performed in any suitable way. For example, after boiling, the hopped wort can be settled to clarify, effective to separate out solid particles, including coagulated protein and hops compounds. In various embodiments, most or a majority of the solid particles are separated from the wort concentrate.

Block 206 acidifies the wort concentrate. This can be performed in any suitable way. For example, phosphoric or lactic acid can be added to the wort effective to acidify the wort to a pH of between about 2.0 and about 3.0. In various embodiments, sulfur is added to a level of 10 ppm or more. This can be performed in any suitable way. For example, sodium metabisulphite and/or potassium metabisulphite can be added in an amount effective to adjust the sulfur level to 10 ppm or more.

Next, block 208 cools the wort concentrate. This can be performed in any suitable way. For example, the wort can be transferred from the whirlpool through a heat exchanger into a fermenter for cooling. Other methods of cooling wort concentrate can be used depending on the particular embodiment. In various embodiments, the wort concentrate is cooled to a temperature between about 58 and about 60 degrees Celsius.

Finally, block 210 packages the wort concentrate. This can be performed in any suitable way. For example, the wort concentrate can be packaged and shipped in predetermined sizes, weights, or the like. For example, the wort concentrate can be packaged into 20 or 25 liter bags in boxes or a suitable one-way vessel. In various embodiments, the wort concentrate is packaged at a temperature between about 58 degrees Celsius and about 60 degrees Celsius.

Process 200 can be used to package the wort concentrate such that the wort concentrate is substantially microbiologically stabilized. While various techniques included in process 200 can contribute to the stabilization and sterilization of the wort concentrate, a substantially microbiologically stable wort concentration can be achieved by using less than all of these techniques. For example, packaging the wort at a temperature between about 58 degrees Celsius and about 60 degrees Celsius can have a pasteurization effect. As another example, acidification of the wort concentration to a pH of between about 2.0 and about 3.0 can have a deleterious effect on bacteria and yeast to minimize or even prevent bacterial and/or yeast growth or survival. In some embodiments, alternative techniques may be employed.

Once packaged, the wort concentrate can be shipped to a retail outlet, such as a restaurant, bar, store, or the like, for use in producing beer.

Producing Beer from Wort Concentrate

Figure 3:
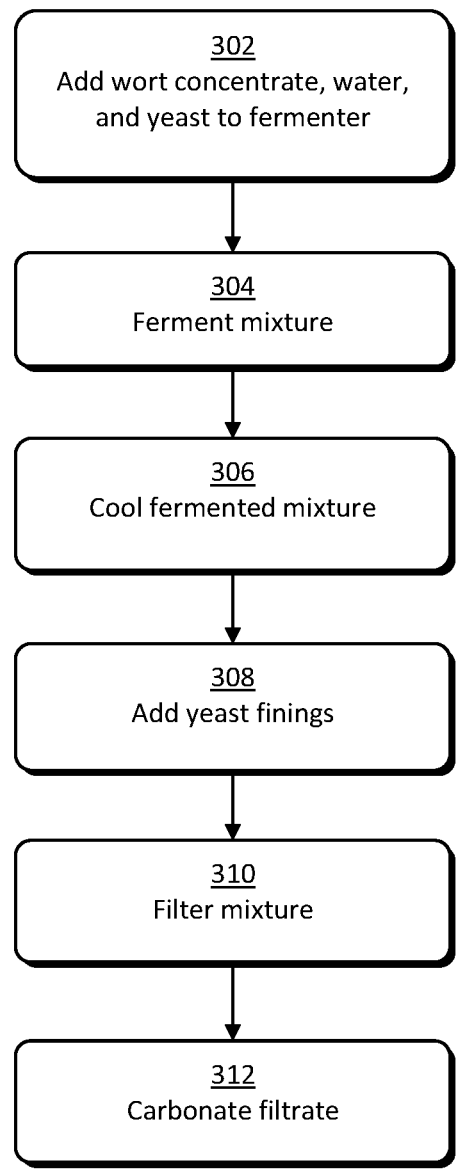
FIG. 3 is a block diagram of an example process for producing a fermented mixture from wort concentrate in accordance with one or more embodiments.

FIG. 3 is a block diagram of an example process 300 for producing beer from wort concentrate. The wort concentrate can be, for example, the wort concentrate produced by process 100 and packaged by process 200. In various embodiments, the wort concentrate can be selected based upon the end-type of beer desired, such as, for example, lager, dry, amber, stout, wheat, or the like. In various embodiments, process 300 can be performed by an automated system.

Block 302 adds the wort concentrate, water, acid neutralizer, and yeast to a fermenter. In some embodiments, other ingredients may also be added. This can be performed in any suitable way. For example, a user can select a recipe from a system screen and a predetermined amount of wort concentrate can be pumped (for example using means for adding ingredients 440 of FIG. 4, utilising pumps and valving known in the art for transfer of ingredients within a brewing system) into a fermentation tank (for example fermentation tank 430 of FIG. 4) according to the selected recipe. Filtered water, an acid neutralizing solution, and yeast can also be added to the fermentation tank. This can be performed by a user or automatically by the system. In embodiments when the mixture is formed by a system, the system can receive a user selection of a recipe and cause an appropriate amount of each ingredient to be added to the tank.

Block 304 ferments the mixture. This can be performed in any suitable way. For example, in some embodiments, a user can push a "start" button when all ingredients have been added by block 302, or the system can automatically start fermenting upon the addition of ingredients. In various embodiments, temperature and carbon dioxide evolution are monitored during fermentation using means for monitoring fermentation conditions 450 (see FIG. 4). Carbon dioxide evolution can be calibrated against specific gravity drop and subsequent alcohol development through a mass flow meter of the means for monitoring fermentation conditions 450. Temperature sensing may be performed using one or more temperature sensors of the means for monitoring fermentation conditions 450, as known in the art. In various embodiments, the mixture is fermented until carbon dioxide evolution reaches a pre-determined level.

Next, block 306 cools the fermented mixture. This can be performed in any suitable way. For example, when monitored carbon dioxide levels indicate fermentation is substantially complete, temperature of the fermentation tank can be decreased using fermentation tank temperature control means 432 (see FIG. 4) effective to cool the fermented mixture to a temperature between about zero and about four degrees Celsius. For example, the fermentation tank temperature control means 432 may comprise an internal or external cooling system as known in the art. An internal cooling system submerges the cooling device (e.g. rods or coils) within the liquid, while an external cooling system cools the tank itself—for example using a shell or jacket having channels through which a coolant runs (e.g. chilled water or a glycol solution). The fermentation tank temperature control means 432 may further comprise a controller configured to control the cooling system to achieve or maintain the desired temperature—for example as part of, or in communication with, system 400. In various embodiments, the fermented mixture is cooled at a temperature between about zero and about four degrees Celsius for about five to seven days. The time and temperature of cooling can vary depending on the particular embodiment.

Block 308 adds yeast finings. This can be performed in any suitable way. For example, after discharging waste yeast and cleaning system lines, yeast finings can be introduced into the fermentation tank. For example, the yeast finings may be introduced via a dosing pump, or manually via a valve or other port. In various embodiments, yeast finings are added to the fermented mixture and the mixture is stored for about twenty-four hours.

Next, block 310 filters the mixture. This can be performed in any suitable way. For example, the mixture can be filtered into a bright tank or another vessel. Various forms of filter types and filter mediums are known in the art of brewing. In various embodiments, filtration can occur automatically. In some embodiments, a pH meter, flowmeter, and pressure transducers can be used to monitor filtration. It will be appreciated that the transfer between vessels may be achieved using any suitable means in the art, for example using pumps, pipework and valving.

Finally, block 312 carbonates the filtrate. This can be performed in any suitable way. For example, a carbon dioxide and time dependent regime can be implemented automatically upon transfer of the filtrate into the bright tank. Upon carbonation, the beer is ready for consumption. The beer can be, for example, packaged into cans, bottles, or kegs, or can be otherwise prepared for consumption.

The techniques described above can be implemented to produce beer from a wort concentrate. In various embodiments, the techniques can be implemented by an automatic system such that a brew master need not be on-site to produce the beer. Consider the following example system that can be used to implement one or more embodiments.

Example System

Figure 4:
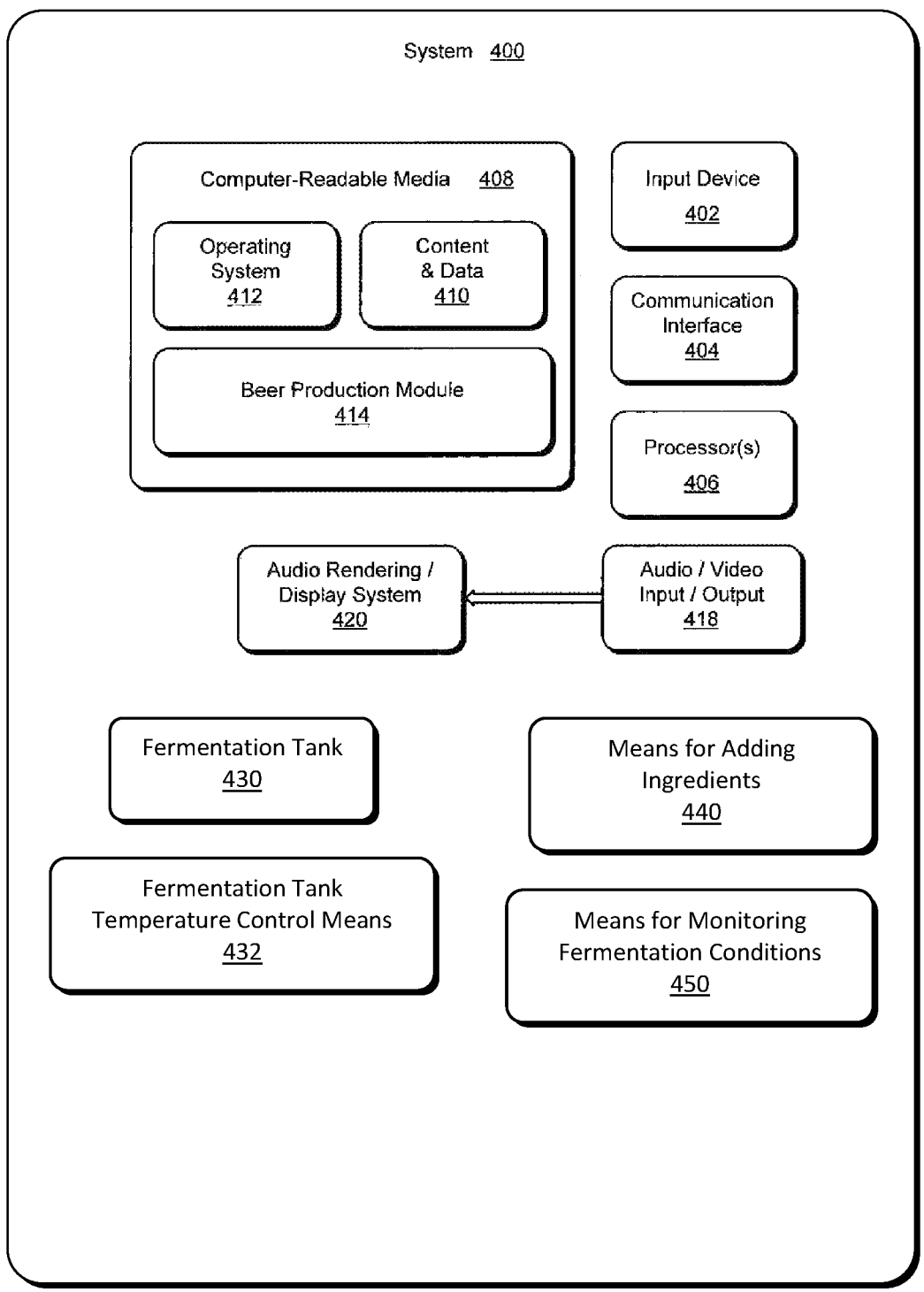
FIG. 4 is a block diagram of an example system that can be used to implement one or more embodiments.

FIG. 4 depicts an example system 400 that can be used to implement one or more embodiments. For example, system 400 can be used to automatically produce beer from wort concentrate, such as described in example process 300.

System 400 includes input device 402 that may include Internet Protocol (IP) input devices as well as other input devices, such as a keyboard. Other input devices can be used, such as a pressure transducer, pH meter, flow meter, and the like. System 400 further includes communication interface 404 that can be implemented as any one or more of a wireless interface, any type of network interface, and as any other type of communication interface. Through communication interface 404, system 400 can direct other components, such as fermentation tanks, bright tanks, filtration components, and the like, to be configured according to particular parameters. A network interface provides a connection between system 400 and a communication network by which other electronic and computing devices can communicate data with system 400. A wireless interface can enable system 400 to operate as a mobile device for wireless communications.

System 400 also includes one or more processors 406 (e.g., any of microprocessors, controllers, and the like) which process various computer-executable instructions to control the operation of system 400 and to communicate with other electronic devices. System 400 can be implemented with computer-readable media 408, such as one or more memory components, examples of which include random access memory (RAM) and non-volatile memory (e.g., any one or more of a read-only memory (ROM), flash memory, EPROM, EEPROM, etc.). A disk storage device may be implemented as any type of magnetic or optical storage device, such as a hard disk drive, a recordable and/or rewriteable compact disc (CD), any type of a digital versatile disc (DVD), and the like.

Computer-readable media 408 provides data storage to store content and data 410, as well as device executable modules and any other types of information and/or data related to operational aspects of system 400. The data storage to store content and data 410 can be, for example, storage of recipes for producing beer from wort concentrate and production routines to produce the beer. For example, various routines for times and temperatures of the fermentation tank can be stored as content and data 410. One such configuration of a computer-readable medium is signal bearing medium and thus is configured to transmit the instructions (e.g., as a carrier wave) to the hardware of the computing device. The computer-readable medium may also be configured as a computer-readable storage medium and thus is not a signal bearing medium. Examples of a computer-readable storage medium include a random access memory (RAM), read-only memory (ROM), an optical disc, flash memory, hard disk memory, and other memory devices that may use magnetic, optical, and other techniques to store instructions and other data. The storage type computer-readable media are explicitly defined herein to exclude propagated data signals.

An operating system 412 can be maintained as a computer executable module with the computer-readable media 408 and executed on processor 406. Device executable modules can also include a beer production module 414 as described above and below.

Beer production module 414 can be implemented to control various facets of beer production, such as described in process 300. For example, beer production module 414 can control dilution, fermentation, filtration, transfers of filtrate and mixtures between vessels, carbonation, and cleaning. In various embodiments, beer production module 414 monitors carbon dioxide evolution using the mass flow meter of the means for monitoring fermentation conditions 450 and, upon detecting that a pre-determined amount of carbon dioxide has been released into the atmosphere, can shut off the gas valve effective to use additional carbon dioxide generated to pre-carbonate the beer. In various embodiments, the beer is pre-carbonated to a level of 2.0-2.6 (volume/volume), and is measured by an input device 402, such as a pressure transducer.

In addition to measuring carbon dioxide evolution, beer production module 414 is configured to monitor alcohol formation and a drop in the specific gravity of the mixture. For example, given static state conditions of volume and temperature, beer production module 414 can monitor the alcohol formation and specific gravity drop through evolution of carbon dioxide. When the appropriate alcohol content has been reached, beer production module 414 can cause the fermenter to be cooled by fermentation tank temperature control means 432 and arrest further fermentation. In various embodiments, beer production module 414 causes the fermenter to be cooled when the specific gravity of the beer is about 1.045 kg/m.

Beer production module 414 can also be configured to cause a beer brewing system, including fermenters, transfer lines, filtration equipment, and bright tanks, to be cleaned. For example, in addition to being connected to each of these components via communication interface 404, system 400 can be connected to a clean water tank in which cleaning solutions can be made. Beer production module 414 can direct a cleaning solution to be transferred to one or more specific components, implement and time a cleaning regime, and cause the component to be sanitized.

System 400 also includes an audio and/or video input/output 418 that provides audio and/or video data to an audio rendering and/or display system 420. The audio rendering and/or display system 420 can be implemented as integrated component(s) of the example system 400, and can include any components that process, display, and/or otherwise render audio, video, and image data.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). It should be appreciated that the present disclosure is not described with reference to any particular programming languages, and that a variety of programming languages could be used to implement the present invention. A general purpose processor may be a microprocessor, but in the alternative, the processor may be any processor, controller, microcontroller, or state machine. A processor may also be implemented as a combination of computing devices, for example, a combination of a digital signal processor (DSP) and a microprocessor, a plurality of microprocessors, one or more microprocessors in conjunction with a DSP core, or any other such configuration. The processors may function in conjunction with servers and network connections as known in the art.

The program code can be stored in one or more computer-readable storage devices. The features of the techniques described above are platform-independent, meaning that the techniques may be implemented on a variety of commercial computing platforms having a variety of processors.

Brewing System with Dispensing of Additives

Figure 5:
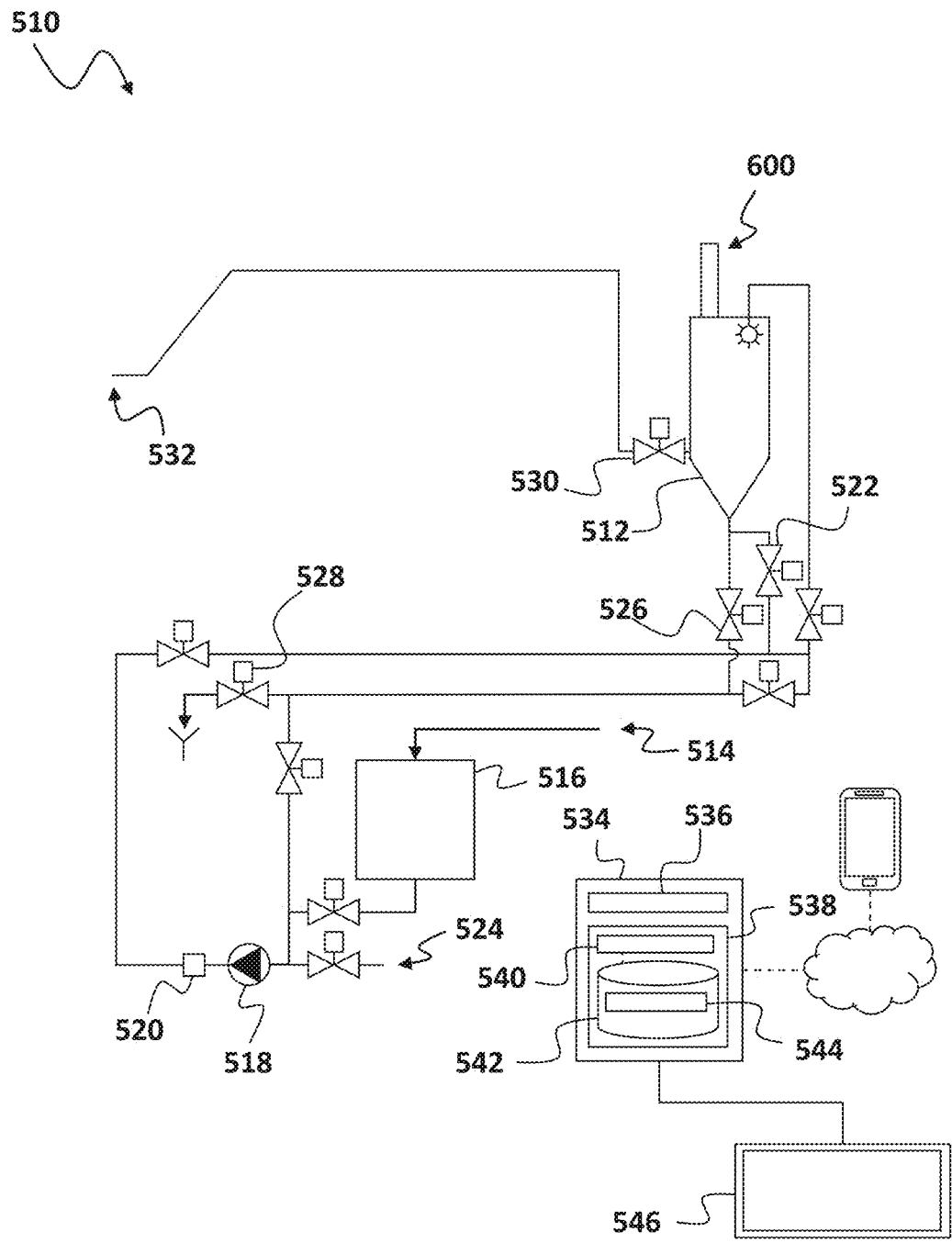
FIG. 5 is a schematic diagram of an exemplary brewing system in accordance with an embodiment of the present disclosure.

FIG. 5 presents a schematic diagram of a brewing system 510. The brewing system 510 includes a fermentation vessel (herein referred to as the "fermenter 512") in which ingredients of a fermented beverage are mixed, fermented under controlled conditions, and subsequently dispensed from. It should be appreciated that while the system 510 may be described herein in relation to the production of beer, it should be appreciated that this is not intended to be limiting and may be used for the production of other fermented beverages.

Water is supplied to the fermenter 512 from a water supply 514, heated to temperature in a temperature controlled tank 516. The water is pumped using pump 518, with flow being monitored by flow meter 520. Ingress into the fermenter 512 is achieved via fermenter inlet valve 522.

In operation, wort is supplied to the fermenter 512 via a wort supply connection 524, pumped and monitored using pump 518 and flow meter 520 respectively. Once the wort transfer is completed, water is pumped into the fermenter 512 from the tank 516.

Yeast is then pitched into the fermenter 512 and fermentation begins. During fermentation, carbon dioxide (CO2) is produced as a by-product, and utilised to naturally carbonate the beer as it is fermenting. It should be appreciated that the present disclosure is not limited to use in systems utilising natural carbonation—for example, a dedicated CO2 supply may be used to control pressure levels through introduction of CO2. When fermentation is complete, the fermenter 512 is cooled, causing yeast to fall out of suspension. Accumulated yeast is drained off the bottom of the fermenter 512 through the fermenter drain valve 526 to drain 528.

Naturally clear beer is then dispensed directly from a fermenter outlet valve 530 to a dispensing outlet 532—whether serving taps at a bar, or a filling outlet.

It should be appreciated that unlabelled valves and piping shown in FIG. 5 facilitate Clean in Place (CIP) and Sanitize in Place (SIP) —during which the pump 18 will cycle cleaning and sanitizing chemicals with heated water through the fermenter 12 via spray balls to ensure effective cleaning of the system 10.

Control of the system 510 is performed by controller 534. The controller 534 has a processor 536, memory 538, and other components typically present in such computing devices. In the exemplary embodiment illustrated the memory 538 stores information accessible by processor 536, the information including instructions 540 that may be executed by the processor 536 and data 542 that may be retrieved, manipulated or stored by the processor 536. The memory 538 may be of any suitable means known in the art, capable of storing information in a manner accessible by the processor 536, including a computer-readable medium, or other medium that stores data that may be read with the aid of an electronic device.

The processor 536 may be any suitable device known to a person skilled in the art. Although the processor 536 and memory 538 are illustrated as being within a single unit, it should be appreciated that this is not intended to be limiting, and that the functionality of each as herein described may be performed by multiple processors and memories, that may or may not be remote from each other.

The instructions 540 may include any set of instructions suitable for execution by the processor 536. For example, the instructions 540 may be stored as computer code on the computer-readable medium. The instructions may be stored in any suitable computer language or format.

Data 542 may be retrieved, stored or modified by processor 36 in accordance with the instructions 540. The data 542 may also be formatted in any suitable computer readable format. Again, while the data is illustrated as being contained at a single location, it should be appreciated that this is not intended to be limiting—the data may be stored in multiple memories or locations.

The data 542 stored on server may include a record 544 of control routines for the system 510. For example, different routines may be provided for the production of different beverages—or styles or variations thereof.

A user interface 546 enables communication to and from the controller 534 with regard to the brewing process. It is also envisaged that the controller 534 may communicate over a network 522 with a user device 550 (for example a mobile phone) to provide details of the current status of the system 510 and effectively operate as a remote user interface. The network 522 potentially comprising various configurations and protocols including the Internet, intranets, virtual private networks, wide area networks, local networks, private networks using communication protocols proprietary to one or more companies—whether wired or wireless, or a combination thereof.

An additive dispensing device (herein referred to as "the dispenser 600") is also connected to the fermenter 512, further details of which will be described below.

Figure 6A:
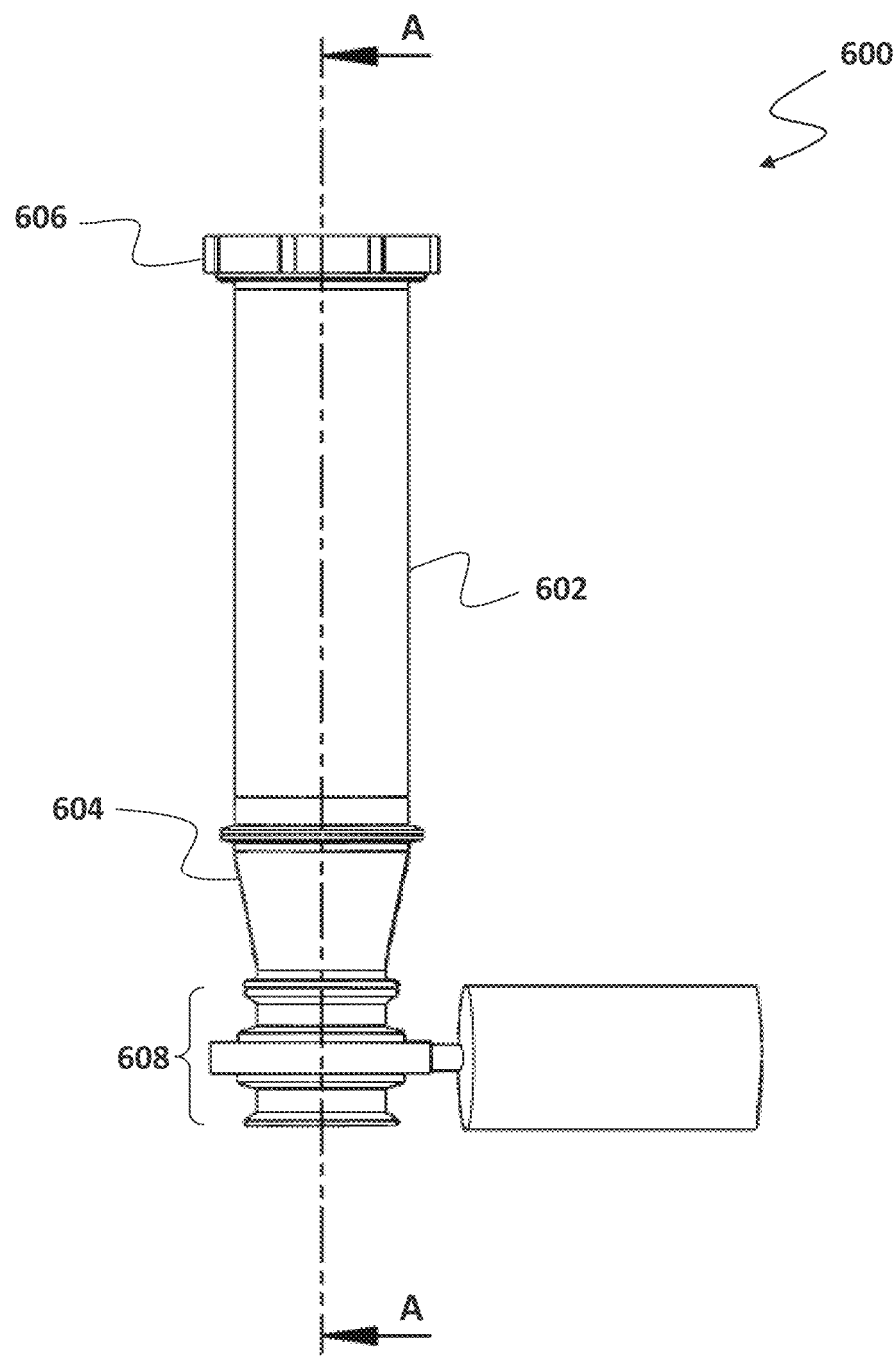
FIG. 6A is a side view of an exemplary additive dispensing device in accordance with an embodiment of the present disclosure.

FIG. 6A shows the exterior of the dispenser 600. The dispenser 600 includes a tubular body 602 with a conical end section 604, and a cap 606 secured to the distal end of the body 602 using complementary screw threads. A butterfly valve 608 is located at the conical end section 604, having a pneumatic actuator controlled by controller 534 of FIG. 5.

Figure 6B:
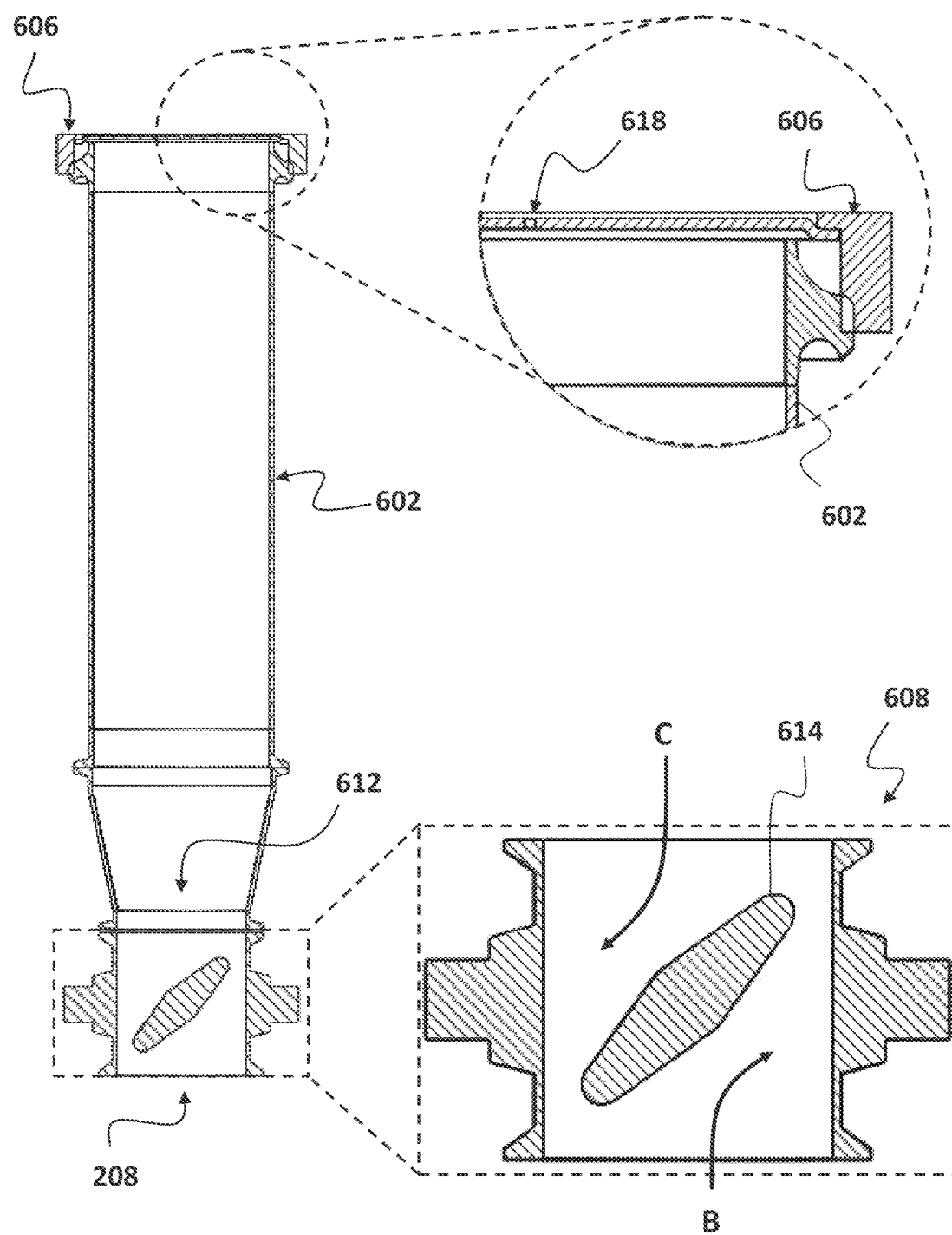
FIG. 6B is cross-sectional side view of the exemplary additive dispensing device in accordance with an embodiment of the present disclosure.

FIG. 6B shows a cross-sectional view of the dispenser 600 along axis A (seen in FIG. 6A). In use, the cap 606 is removed and dry hops (or another additive such as finings) introduced into the chamber of the body 602 by an operator, before reapplying the cap 606. Operation of the butterfly valve 608 controls exposure of the open end 612 of the body 602 to the interior of fermenter 512 (not show here, but see FIG. 5).

On rotation of the disc 614 of the butterfly valve 608 into an open position, pressurised CO2 from the fermenter 512 flows through one side of the valve 608 in a first direction B, and up one side of the chamber, before being redirected back down from the closed end 216 to blow the hops through the other side of the valve 608 in a second direction C.

On closing of the butterfly valve 608, the chamber would be pressurised to substantially that of the fermenter 512, being much smaller in volume than the headspace of the fermenter 512. To enable the chamber to return to atmospheric pressure, a pressure release aperture 618 is provided in the cap 606. In an exemplary embodiment the pressure release aperture 618 is substantially 2 mm in diameter—sufficient to enable rapid bleeding of pressure, without compromising the flushing action achieved by the pressure differential between the fermenter 512 and the dispenser 600.

Figure 7A:
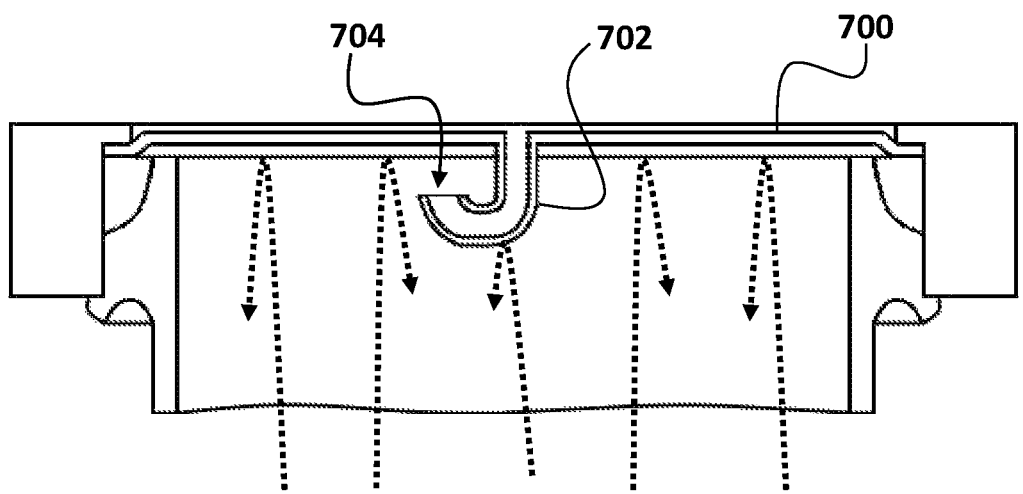
FIG. 7A is cross-sectional side view of an embodiment of a pressure release means of the exemplary additive dispensing device.

FIG. 7A illustrates an alternative cap 700 for use with the dispenser 600. In this embodiment the pressure release aperture is provided in the form of a "J" shaped conduit 702. The conduit 702 has an opening 704 facing towards the cap 700, away from the valve (for example, butterfly valve 608 shown in FIG. 6B). This reduces the likelihood of the additive (illustrated by dashed lines) striking the opening 704 directly following the initial in-rush of $CO_2$.

Figure 7B:
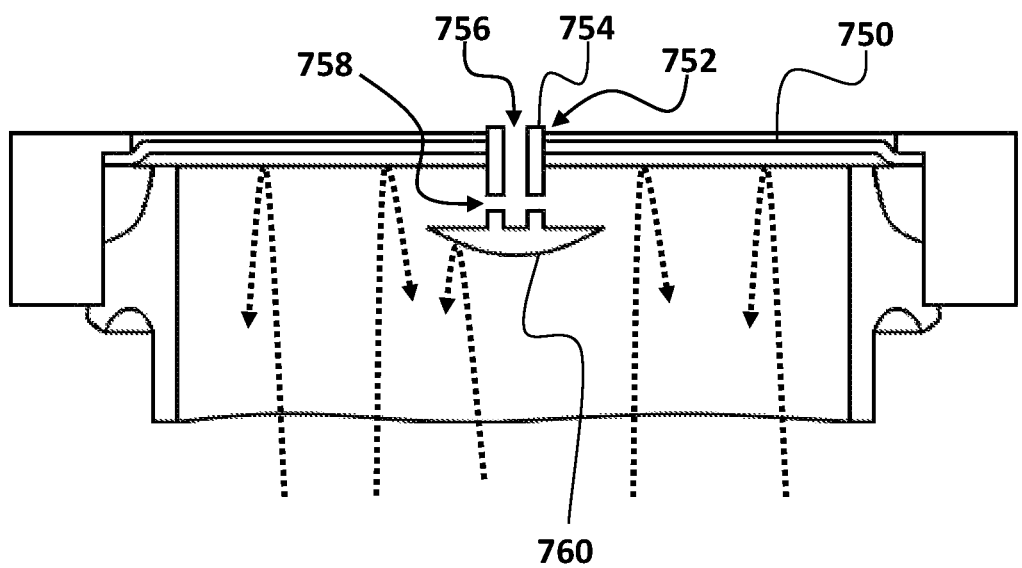
FIG. 7B is cross-sectional side view of another embodiment of a pressure release means of the exemplary additive dispensing device.

FIG. 7B illustrates an alternative cap 750 for use with the dispenser 600. In this embodiment the pressure release aperture is provided in the form of a bolt 752, having a shaft 754 with a central bore 756 intersected by two lateral openings 758 below a mushroom head 760. The head 760 protects the lateral openings 758 against the initial pushing of the additive against the cap 750 (illustrated by dashed lines). In exemplary embodiments the shaft 754 may have external threads engaging with the cap 750 to fix it in place. Alternatively, the bolt 752 may be configured to slide relative to the cap 750, with the initial pressurisation of the chamber pushing the bolt 752 up to block the lateral openings 758.

Figure 8:
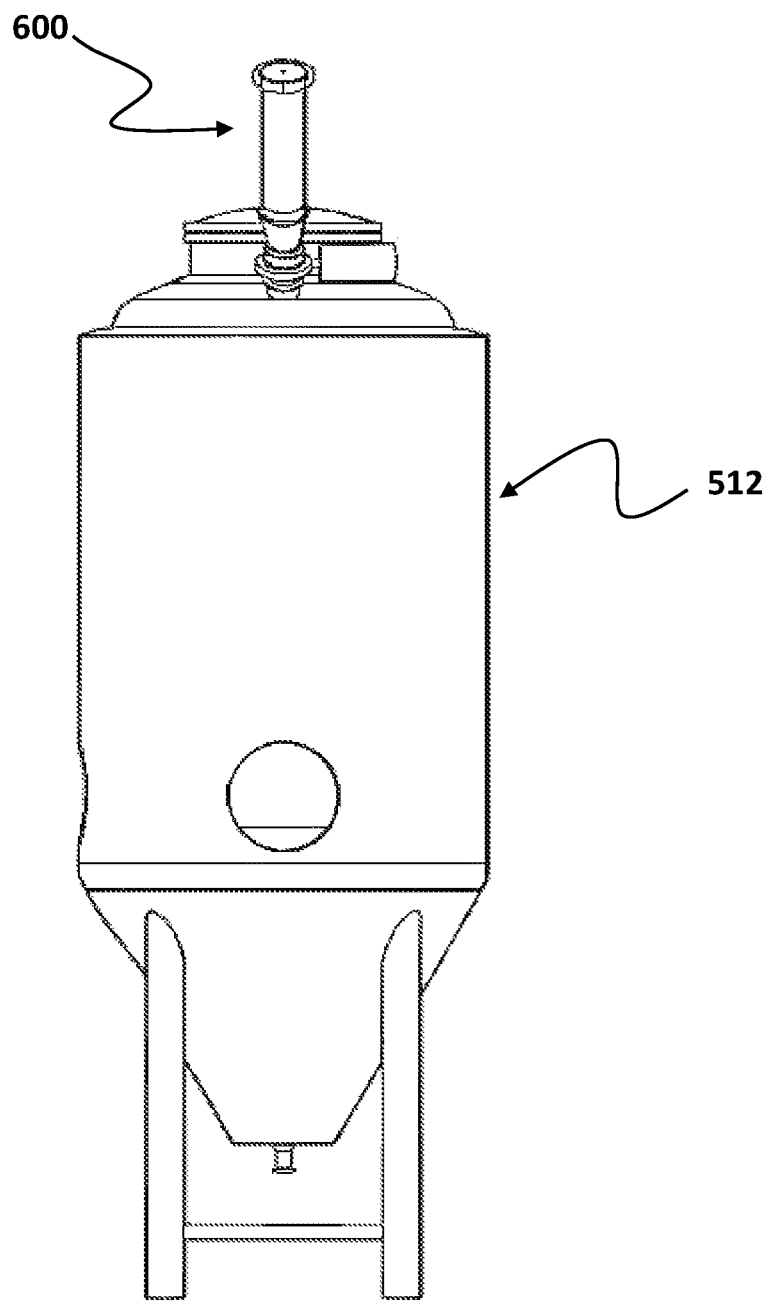
FIG. 8 is side view of the exemplary additive dispensing device connected to an exemplary fermentation vessel in accordance with an embodiment of the present disclosure.

FIG. 8 shows the dispenser 600 mounted to the top of the fermenter 512 in a substantially upright orientation pointing towards the centre of the fermenter 512. This is envisaged as encouraging the flushing action with gravitational feed, and distribution of the additive across a wide area of the surface of the beverage.

Figure 9:
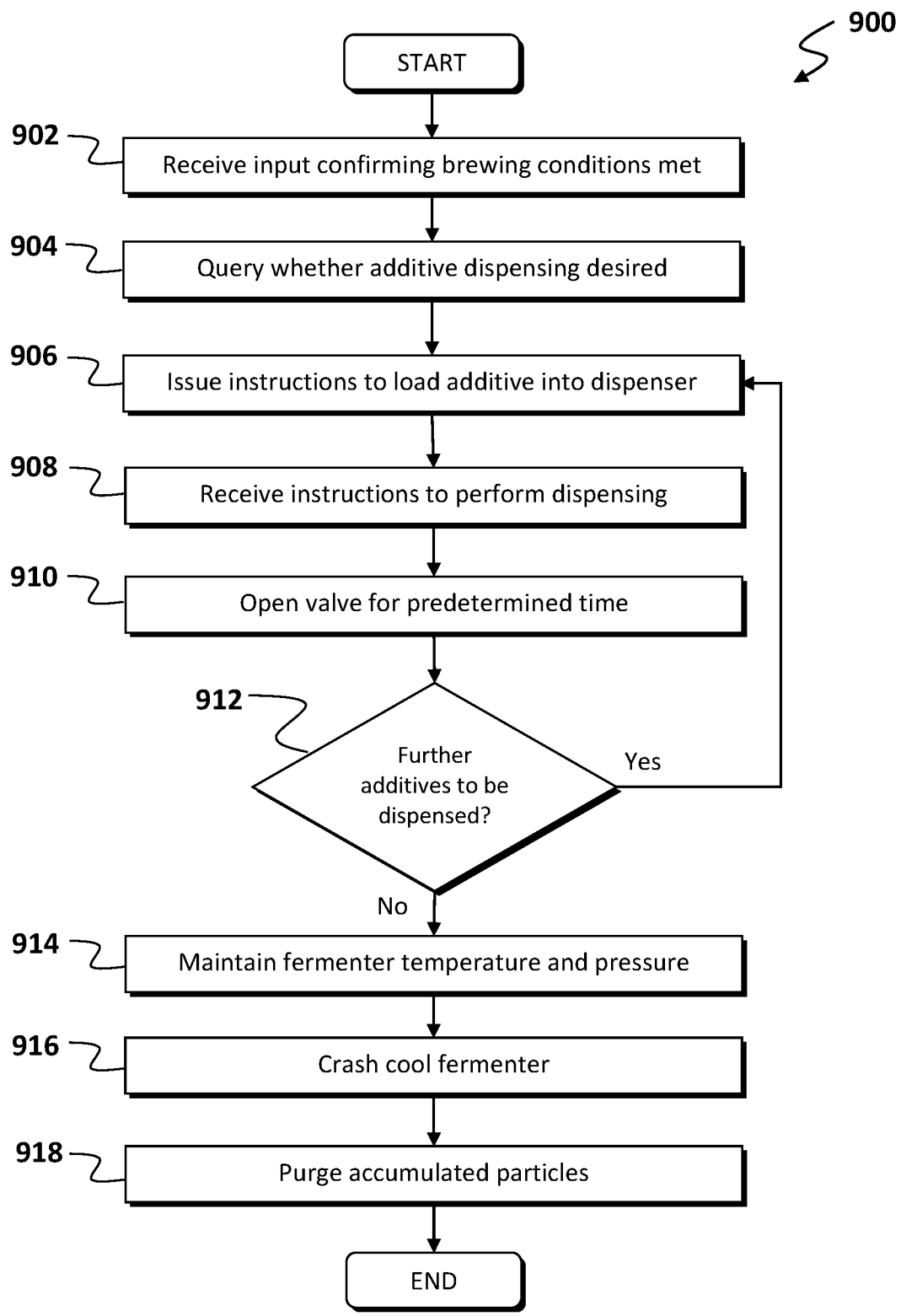
FIG. 9 is flow chart of a method of operating the exemplary brewing system.

FIG. 9 shows a method 900 performed by the controller 534 in operating the brewing system 510. The method 900 is described with reference to the introduction of dry hops to the fermenter 512—but it should be appreciated that the process may equally be applied to the introduction of other types of additive (at an appropriate stage in the brewing process).

In step 902, the controller 534 receives input from an operator via user interface 546 confirming that fermentation is complete—determined, for example, through readings of the beer's specific gravity. In an alternate embodiment the controller 534 may determine completion of fermentation through monitoring conditions of the beverage.

In step 904 the controller 534 issues a query to the operator via user interface 546 as to whether dry hopping is desired. Where the user replies to the affirmative, in step 906 the controller 534 issues instructions via user interface 546 to load dry hopping matter into the chamber of the body 602. The volume and type of hops may be, for example, dictated by the brew sheet for the beer.

In step 908 the controller 534 receives confirmation via user interface 546 to perform dry hopping. Requiring such confirmation via the user interface 546 ensures the operator is removed from the immediate vicinity of the dispenser 600 while it is pressurised. On confirmation, the butterfly valve 608 is opened for a predetermined period of time—for example, approximately 10 seconds—in step 910. On closure of the butterfly valve 508 the pressure within the dispenser 500 is released, to prepare the dispenser 500 for subsequent use.

In step 912 the controller 534 issues a query to the operator via user interface 546 as to whether further hops are to be added. If so, steps 906 to 910 are repeated.

Once the addition of dry hops is confirmed as being completed, in step 914 the controller 534 maintains the temperature and pressure within the fermenter 512 for a predetermined period of time—for example in the order of 24 to 48 hours. After this time has elapsed, in step 916 the controller 534 rapidly reduces the temperature in the fermenter 512 (known as "crash cooling" in the art). This causes the floating yeast and hop particles to fall out of suspension to the bottom of the fermenter 512. Once the target temperature for maturation (for example 2 degrees Celsius) is reached, in step 918, the controller 534 controls the fermenter drain valve 526 to purge accumulated yeast and hop particles from the fermenter 512.

In exemplary embodiments in which the introduction of finings is desired for adjust characteristics of the beverage (such as clarity, flavour, aroma or colour), the dispenser 600 may be used to introduce finings at an appropriate stage of the process. For example, finings may be introduced before or after the crash cooling described above. As described in relation to dry hopping, the controller 34 may be configured to query the operator as to whether finings should be introduced, issue instructions, and control the dispenser 600 on input from the operator.

In exemplary embodiments in which back sweetening is desired, for example during the production of a cider, the dispenser 600 may be used to introduce sweetener such as liquid sugar or fruit juice. This may be performed at the end of fermentation as determined, for example, through readings of the cider's specific gravity and CO2 and alcohol development—and after cooling to a temperature such that re-fermentation does not occur on the addition of a fermentable sugar. As described in relation to dry hopping, the controller 534 may be configured to query the operator as to whether back sweetening is desired, issue instructions, and control the dispenser 600 on input from the operator.

The illustrated embodiments of the disclosure will be best understood by reference to the figures. The foregoing description is intended only by way of example and simply illustrates certain selected exemplary embodiments of the disclosure.

The entire disclosures of all applications, patents and publications cited above and below, if any, are herein incorporated by reference. Reference to any prior art in this specification is not, and should not be taken as, an acknowledgement or any form of suggestion that that prior art forms part of the common general knowledge in the field of endeavour in any country in the world.

The invention(s) of the present disclosure may also be said broadly to consist in the parts, elements and features referred to or indicated in the specification of the application, individually or collectively, in any or all combinations of two or more of said parts, elements or features. Where in the foregoing description reference has been made to integers or components having known equivalents thereof, those integers are herein incorporated as if individually set forth.

Furthermore, the described features, structures, or characteristics may be combined in any suitable manner in at least one embodiment. In the foregoing description, numerous specific details are provided to give a thorough understanding of the exemplary embodiments. One skilled in the relevant art may well recognize, however, that embodiments of the disclosure can be practiced without at least one of the specific details thereof, or can be practiced with other methods, components, materials, et cetera. In other instances, well-known structures, materials, or operations are not shown or described in detail to avoid obscuring aspects of the invention.

Throughout this specification, the word "comprise" or "include", or variations thereof such as "comprises", "includes", "comprising" or "including" will be understood to imply the inclusion of a stated element, integer or step, or group of elements integers or steps, but not the exclusion of any other element, integer or step, or group of elements, integers or steps, that is to say, in the sense of "including, but not limited to".

Aspects of the present disclosure have been described by way of example only and it should be appreciated that modifications and additions may be made thereto without departing from the scope thereof.

The invention claimed is:

1. A system including:
   at least one fermentation tank;
   at least one computer processor configured to execute computer-readable instructions stored on at least one computer-readable storage media to perform a method of producing beer, including the steps of:
   forming a mixture of a wort concentrate including hops and having a specific gravity of at least 1.085 kg/m3, with water and yeast in the fermentation tank, wherein forming the mixture comprises pumping the wort concentrate into the fermentation tank;
   fermenting the mixture;
   monitoring fermentation conditions, and on determining with the at least one computer processor that predetermined fermentation conditions have been met, cooling the fermented mixture to a temperature between zero and four degrees Celsius; and
   carbonating the fermented mixture, following addition of yeast finings, such that beer is produced.

2. The system of claim 1, wherein the computer processor is configured to:
   receive a user selection of a recipe; and
   cause an appropriate amount of wort concentrate, water, and yeast to be added to the fermentation tank for forming of the mixture according to the recipe.

3. The system of claim 1, the computer processor being further configured to monitor the evolution of carbon dioxide effective to enable a determination to be made that fermentation is complete.

4. The system of claim 1, the computer processor being configured to control filtering of the fermented mixture following addition of the yeast finings, wherein controlling filtering of the fermented mixture comprises filtering the fermented mixture into a bright tank or another vessel.

5. The system of claim 1, the computer processor being configured to store the fermented mixture between zero and four degrees Celsius for between five to seven days before adding yeast finings.

\* \* \* \* \*